Patented Jan. 23, 1945

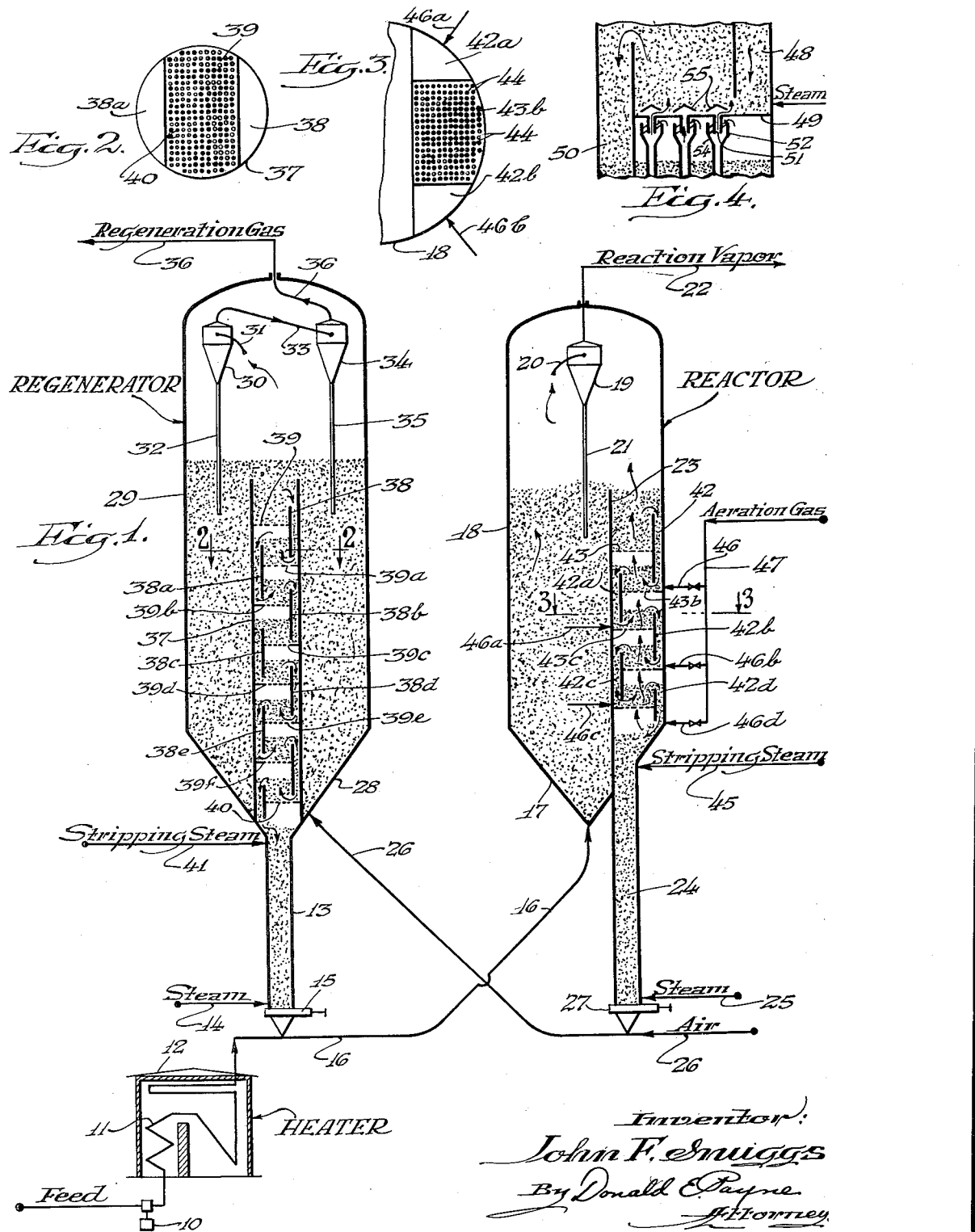

2,367,694

UNITED STATES PATENT OFFICE 2,367,694

POWDERED SOLIDS STRIPPING SYSTEM

John F. Snuggs, Chicago, Ill., assignor to Standard Oil Company, Chicago, Ill., a corporation of Indiana Application June 25, 1942, Serial No. 448,389

4 Claims. (Cl. 23—1)

This invention relates to a powdered solids stripping system and it pertains more particularly to improved method and means for stripping hydrocarbons from powdered catalyst solids in a fluid-type conversion system.

In the powdered or fluid-type catalyst system a powdered catalyst effects a conversion while suspended in a hydrocarbon vapor stream. It is then separated from the hydrocarbon vapors and suspended in a gas mixture for regeneration. Regenerated catalyst is then separated from regeneration gases and resuspended in the hydrocarbon vapor stream for effecting further conversion.

The catalyst which is separated from hydrocarbon vapors contains a considerable amount of vaporizable hydrocarbon material adsorbed thereon or associated therewith. Furthermore, the catalyst from the reactor is still dispensed and suspended in hydrocarbon gases or vapors and remains so suspended until the hydrocarbon gases or vapors are stripped out and replaced by an inert gas such as steam. The stripping gas serves to displace the hydrocarbon vapors and to thereafter serve the function of maintaining the catalyst in dense phase suspension. It is essential that such vapors and vaporizable hydrocarbons be stripped from the catalyst before it is introduced into the regeneration zone, otherwise there is not only a considerable loss of valuable hydrocarbon materials but there is an unduly heavy load on the regeneration system and an aggravating problem of temperature control and heat disposal. An object of my invention is to provide an improved method and means for removing such vaporizable hydrocarbon material from the powdered catalyst in the course of its transfer from the conversion to the regeneration system.

The powdered catalyst is removed from the conversion zone as a downwardly moving column and it has heretofore been proposed to strip the catalyst in this column by simply injecting steam into the downwardly moving column so that the steam will pass countercurrent to downwardly moving catalyst. The downwardly moving catalyst column consists of a dense fluent mass of powdered solids. When stripping steam is introduced into this column there is a marked tendency for by-passing, short circuiting or a failure of this steam to intimately contact all portions of the downwardly moving catalyst solids. The steam rises upwardly in the column like gas bubbles in liquid but there is a tendency for these bubbles to drift to one side or the other of the column so that the catalyst in a large part of the column is insufficiently stripped. An object of my invention is to insure complete stripping of all catalyst particles in their transfer from the conversion zone to the regeneration zone. A further object is to accomplish this stripping in a simple and expeditious manner. A further object is to obtain a true countercurrent stripping effect so that catalyst already freed from a part of the vaporizable hydrocarbons is contacted with fresh dry steam and so that a minimum amount of steam may effectively and efficiently remove substantially all of the vaporizable hydrocarbons from the powdered solids.

While my invention is primarily directed toward the recovery of vaporizable hydrocarbons from powdered catalyst it is also applicable to the removal of oxygen containing carrier gases from regenerated catalyst. In fact, the invention is applicable to any system for recovering a carrier gas or an absorbed or adsorbed vaporizable material from powdered solids in the course of their transfer from one zone to another.

In practicing my invention I employ a system wherein upflowing gases or vapors produce dense turbulent suspended catalyst phases in the main part of the reactor and regenerator and a light dispersed catalyst phase superimposed above each dense phase. I withdraw catalyst downwardly from the dense turbulent suspended catalyst phase preferably at a point adjacent the upper level of said phase so that the draw-off column is in effect an overflow pipe. A feature of this dense phase withdrawal system is that catalyst may be effectively stripped in the overflow column before it is introduced into another contacting zone. This overflow pipe or catalyst transfer column is provided with a series of downcomers and perforated plates or trays somewhat similar to the downcomers and trays employed in the so-called "bubble tower" for the fractionation of hydrocarbons or other fluids. A dense turbulent suspended solids phase is maintained above each of the perforated plates or trays, powdered catalyst is transferred from an upper dense phase to the adjacent lower dense phase by means of a downcomer and the stripping gas passes in series from the bottom tray upwardly through each successive dense phase zone to the top of the column. By employing this system I not only insure the intimate contacting of catalysts with the stripping gas but I also obtain a countercurrent stripping effect so that effective removal of carrier gas and vaporizable hydrocarbons is obtained with a minimum amount of steam.

The column itself may be either inside or outside of the conversion or regeneration zone but I prefer to employ an internally mounted column because of decreased construction costs and decreased heat losses. By maintaining at least a part of the column or stripping zone inside the reaction zone so that there is an indirect heat exchange relationship therein, heat losses to a cooler surrounding atmosphere are materially decreased. By using an internal stripping column I may employ a conversion reactor vessel of uniform diameter and, at the same time, obtain a decreased gas or vapor velocity in the upper part of the chamber because the stripping column decreases the effective cross-sectional area of the lower part of the chamber so that the vertical gas or vapor velocity above the stripping column will be sufficiently lower than the vertical gas or vapor velocity in the main part of the chamber to provide for adequate settling out of powdered catalyst from gases or vapors in the top of the chamber. The invention will be more clearly understood from the following detailed description of a specific example and from the accompanying drawing which forms a part of this specification and in which:

Figure 1 is a schematic flow diagram of a fluid-type catalytic cracking system with reaction and regeneration towers in schematic vertical section;

Figure 2 is a horizontal section taken along the lines 2—2 of Figure 1;

Figure 3 is a horizontal section taken along the lines 3—3 of Figure 1; and

Figure 4 is a vertical section of a stripper tray or plate combined with centrifugal catalyst separation means.

While the invention is applicable to a wide variety of hydrocarbon conversion processes such as isomerization, desulfurization, polymerization, reforming, isoforming, alkylation, gas reversion, hydrogenation, dehydrogenation, etc., it is particularly applicable to the catalytic cracking of gas oils and heavier hydrocarbons. The charging stock may consist of or may contain hydrocarbons produced by other conversion processes such as cracking or coking, hydrocarbons synthetically produced by the hydrogenation of carbonaceous materials, or hydrocarbons produced by a carbon monoxide-hydrogen synthesis (the so-called Fischer synthesis). A catalytically cracked gasoline may serve as a charging stock in a process for making aviation fuel of low acid heat and high octane number. In the specific example hereinafter set forth I will describe the invention as applied to a 10,000 barrel per day catalytic cracking plant in which the charge may be a Mid-Continent gas oil or a mixture of Mid-Continent gas oil with coke still distillate.

The catalyst employed will depend of course on the nature of the conversion to be effected but in all cases it should consist of finely divided solids which can be suspended in upflowing gases or vapors to give a dense turbulent liquid-like catalyst phase. In the specific example I employ an acid treated montmorillonite or bentonite clay commonly known as Super Filtro and I employ the catalyst in powdered form with a particle size chiefly within the range of 1 to 100 microns. In other words, the catalyst in this example will all pass a 200 mesh screen. A considerable amount will pass a 400 mesh screen but likewise a considerable amount will be retained on the 400 mesh screen. By proper adjustment of vertical vapor velocities in the system, catalyst particles of larger size may be employed, i. e., particles as large as 100 mesh, 50 mesh or even 10 mesh.

The density of the catalyst particles per se may be as high as 160 pounds per cubic foot but the bulk density of compacted and settled catalyst is usually within the approximate range of 25 to 50 pounds or more per cubic foot. With slight aeration, i. e., with vertical gas or vapor velocities of about .05 to .5 foot per second, or with the introduction of sufficiently small amounts of gas to produce no appreciable gas flow, the bulk density of this catalyst may be about 20 to 35 pounds per cubic foot. With vertical gas or vapor velocities in the approximate range of .5 to 4 feet per second and particularly at about 1½ to 2 feet per second, the powdered catalyst assumes a dense turbulent suspended catalyst phase the bulk density of which is within the approximate range of 5 to 25, for example about 15 to 20 pounds per cubic foot. The expression "dense phase" as employed in this specification refers to suspended catalyst material of a density within the approximate range of 5 to 25 pounds per cubic foot and such dense phases are maintained in the lower part of the reactor, in the lower part of the regenerator, and in the stripping zones to be hereinafter described.

Above the dense phase in the reactor, regenerator and stripping zones the catalyst settles out of ascending gases or vapors so that there is a light dispersed or dilute phase the average density of which is considerably less than 1 pound per cubic foot and which may be as low as 5 to 100 grains per cubic foot. This gas phase with only a small amount of suspended catalyst is herein referred to as the "light dispersed" or "dilute" phase.

It should be understood that my invention is not limited to any particular type of catalyst. For catalytic cracking the catalyst is preferably of the silica-alumina or silica-magnesia type and instead of Super Filtrol I may employ a synthetically prepared silica-alumina or silica-magnesia catalyst. An excellent catalyst may be prepared by ball-milling silica hydrogel with alumina or magnesia, using about 2 to 30% for example about 15 or 20% of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia, thoria, aluminum fluosilicate, etc. The particle size and density of such catalysts may be approximately the same as the Super Filtrol catalyst hereinabove described. My invention is applicable to any catalyst and any catalyst size provided only that the catalyst be of such size and density that it may be aerated and handled as a fluid in the manner herein described.

The gas oil feed stock is introduced by pump 10 to coils 11 of pipestill 12. The gas oil is vaporized in coils 12 and heated to a transfer line temperature of about 750 to 1050° F. for example about 900 to 925° F. at a pressure within the range of atmospheric to 50 pounds per square inch, for example about 15 pounds per square inch. Steam may be separately heated and introduced into the transfer line, the amount of steam ranging from about 2 to 20%, for example about 10% by weight based on oil charged. In some cases the heat available in the hot regenerated catalyst is sufficient to effect at least a part of the vaporization, superheating and cracking of the charging stock and when sufficient heat is thus available in the hot recycled regenerated catalyst the pipestill may be entirely dispensed with.

Hot regenerated catalyst from standpipe 13 is aerated by steam or other inert gas introduced by line 14 and introduced in amounts regulated by slide valve 15 into pipestill transfer line 16 wherein it is picked up by the superheated charging stock vapors and introduced into the cone-shaped bottom 17 of conversion chamber 18. The catalyst-to-oil weight ratio of materials introduced into the reactor may be about 1:1 to about 20:1, for example about 4:1. The temperature of the catalyst from standpipe 13 may be about 900 to 1100° F., for example about 1000° F. The suspended catalyst stream may be introduced at the base of the reactor at a temperature of about 800 to 1050° F., for example about 925° F. The average vertical vapor velocity in the reactor may range from about .5 to 4 feet per second, for example, may be about 1.5 to 2 feet per second and the pressure at the point of introduction may be in the general vicinity of 10 to 12 pounds per square inch.

The reactor may be a cylindrically-shaped vessel about 13 to 15 feet in diameter and about 25 to 40 feet in height. It should be understood, of course, that the size and shape of the reactor may be varied within fairly wide limits depending upon the particular catalyst employed, the operating conditions for which it is designed and the results to be accomplished.

The average catalyst residence time in the reactor may range from about 1 to 60 minutes or more and may, for example, be about 8 minutes. The average vapor residence time may be about 5 to 30 seconds. Catalyst settles from the dilute phase in the upper part of the reactor back to the dense phase therein and residual catalyst particles may be removed from reaction products by means of one or more stages of cyclone separators diagrammatically represented by cyclone separator 19 having a vapor inlet 20, a dip leg 21 extending into the dense catalyst phase and a vapor discharge line 22 leading to a fractionation system (not shown). It should be understood, of course, that any type of centrifugal separation means may be employed for removing catalyst from exit gases and that instead of or in addition to such centrifugal separation I may employ electrostatic precipitators, filters, scrubbers or, in fact, any separation means known to the art. The separation means may be inside or outside or partly in and partly out of the reactor.

At one side of reactor 18 and extending almost to the top of the dense catalyst phase therein is an overflow pipe or stripping column 23. This stripping column may be formed by simply walling off a segment of the tower itself by a chord plate (as illustrated in Figure 3) or it may consist of a cylindrical pipe or column mounted adjacent the chamber wall or at any other point within the chamber. By mounting the stripping column inside the reactor chamber at least a part of the stripping zone is maintained in indirect heat exchange relationship with the reaction zone. The cross-sectional area of this stripping column 23 may be about 10% to 50% of the cross-sectional area of chamber 18 itself so that the effective cross-sectional area of the chamber above the stripping column is larger than the cross-sectional area in the dense phase zone, thus causing a decrease in upward gas or vapor velocity in the top of the chamber and permitting catalyst particles to settle out of the dilute phase into a dense phase. Of course gases from the stripping column will be admixed with reaction product gases and vapors in the upper part of tower or chamber 18 but in view of the relatively small amount of stripping gas used, there will still be a decrease in vertical gas velocity in the upper part of this tower. The upper part of the tower may of course be enlarged to any desired extent to still further reduce gas velocities therein and to insure adequate settling out of catalyst solids.

After passing through the stripping column the spent catalyst flows downwardly through standpipe 24 which is aerated by steam or other aeration gas introduced through line 25. Spent catalyst from the base of standpipe 24 is picked up by air introduced by line 26 in amounts regulated by slide valve 27 and is carried by pipe 26 to the bottom 28 of regenerator 29. The regenerator may be about 20 feet in diameter by about 40 feet or more in height and is so designed that the vertical gas velocity therein will be of the order of .5 to 4, for example about 1½ to 2 feet per second. In the upper part of the regenerator or outside of the regenerator I may provide suitable catalyst recovery means diagrammatically illustrated by cyclone separator 30 having an inlet 31 and a dip leg 32, the latter extending below the level of the dense catalyst phase in the regenerator. Regeneration gas leaves cyclone 30 through line 33 to a second stage cyclone separator 34 which is provided with dip leg 35 extending below the level of dense catalyst phase in the regenerator. Regenerator gas leaves cyclone 34 through 36 and may be passed through suitable heat exchangers or other means for recovering heat and through suitable electrostatic precipitators or scrubbing means for recovering any catalyst particles not recovered in the cyclone separators. Temperature control in the regenerator may be effected by the use of heat exchange surfaces therein, or by cooling material introduced thereto, or by recycling a portion of the regenerated catalyst through a cooler and then back to the regenerator.

Overflow pipe or stripping column 37 extends upwardly in the regenerator to a point below the dense phase level therein and conducts the regenerated catalyst to the top of standpipe 13. Stripping is not as essential in the regenerator as in the reactor and hence a shorter column may be employed and, in fact, the stripping of regenerated catalyst may be unnecessary. It is desirable, however, to displace oxygen before regenerated catalyst goes to reactor. I have shown such a column centrally located in the regenerator to illustrate a central mounting of such conduit as well as a lateral mounting shown in reactor 18. Either the central mounting or the lateral mounting or any other mounting may be used in either the reactor or regenerator in accordance with my invention.

Stripping column 37 is provided with a plurality of downcomers 38, 38a, 38b, 38c, etc. each of which is associated with a perforated plate or partition 39, 39a, 39b, 39c, etc. The downcomers may be independent conduits or may be formed by chord plates welded or otherwise secured to the column itself as illustrated in Figure 2. The portion of the perforated plate or partition which is immediately below the downcomer is preferably imperforate or at least is so designed as to prevent a rising gas stream in the downcomer which might unduly interfere with the downward flow of dense phase catalyst particles therein.

In operation the dense phase catalyst particles flow over the top of stripping column 37 and are maintained in dense phase suspension above plate or partition wall 39 by upflowing stripping gases within the stripping column, the upward velocity of such gases being of the order of about 0.1 to 2 feet per second. Powdered catalyst from this dense phase overflows through downcomer 38 and is thus introduced to a similar dense phase of suspended catalyst above perforated plate or partition 39a. Dense catalyst from the dense phase above plate 39a overflows through downcomer 38a and flows downwardly into a similar dense phase above perforated plate or partition 39b. Thus the powdered catalyst flows from dense phase zone to dense phase zone downwardly through the column and in each dense phase zone it is contacted with stripping gases passing upwardly through perforations 40 in the plates or partitions. The stripping steam which is introduced through line 41 thus countercurrently contacts the catalyst in its downward flow so that the fresh hot steam introduced through line 41 removes the final amounts of oxygen-containing gases from the catalyst particles and as this steam becomes associated with more and more oxygen-containing gases it contacts catalyst particles which likewise contain larger amounts of oxygen-containing gases. In this way a small amount of steam is extremely effective in removing substantially all of the oxygen-containing gases from the regenerated catalyst as it flows from the dense phase in the regeneration chamber to the top of standpipe 13. The oxygen-containing gases are entirely replaced by steam as the dispersing or carrier gas.

The stripping column 23 in reactor 18 operates in substantially the same way as stripping column 37. Column 23 is provided with a series of downcomers 42, 42a, 42b, 42c, etc. each of which is associated with perforated plates or partitions 43, 43a, 43b, 43c, etc. The spent catalyst associated with relatively large amounts of vaporizable hydrocarbon materials flows directly from the dense phase in reactor 18 into the space above perforated plate 43 and it is maintained in dense phase suspension above plate 43 by upflowing steam or other stripping gas in the column, the vertical vapor velocity of said steam or stripping gas preferably being of the order of .1 to 2 feet per second. The partially stripped catalyst overflows the top of downcomer 42 and is thus introduced into the dense phase above perforated plate or partition wall 43a, where the catalyst is resuspended in upflowing stripping gas. Catalyst from the dense phase above plate 43a passes downwardly through downcomer 42a to the dense phase above perforated plate 43b. Similarly, the catalyst progresses from zone to zone until it reaches the bottom of the stripping column. The perforations 44 in plates 43 are so designed as to prevent appreciable amounts of catalyst from flowing downwardly therethrough and to uniformly distribute the upflowing stripping gas. Thus steam introduced through line 45 is first contacted with powdered catalyst from which the major part of the vaporizable hydrocarbons have already been removed and as the steam gradually becomes associated with more and more hydrocarbon vapors it meets powdered catalyst which is richer and richer in vaporizable hydrocarbons. A minimum amount of steam effects a maximum amount of stripping and there is no possibility of by-passing or short-circuiting since the downwardly moving catalyst particles must pass through zone after zone of independently formed dense phase stripping sections. The steam entirely replaces hydrocarbons as a dispersing or carrier gas. The finally stripped catalyst then passes through standpipe 24 to the regenerator as hereinabove described.

While the system is in continuous operation it is usually unnecessary to provide any aeration in the downcomers since there is little or no tendency for the catalyst to bridge as long as it is in continuous motion. However, it may be desirable to provide aeration means for each of these downcomers and I may thus introduce an aeration gas through lines 46, 46a, 46b, 46c, etc. which, in turn, may be connected to aeration gas line 47. The lateral arrangement of the stripping column illustrated in reactor 18 and in Figure 3 is advantageous when aeration is to be employed because of the ready access to downcomers 46a, 46b, 46c, etc. directly from the outside walls of the reactor.

In order to prevent any possible plugging of the apertures or perforations in plates or partitions I may employ special means as illustrated for example in Figure 4 where the downcomer 48 introduces catalyst into a zone in the stripping column above plate 49 and the catalyst from this dense phase flows to a still lower zone through downcomer 50. The upflowing stripping gas passes from the zone below plate 49 to the zone above this plate through short pipes 51 around which there is a tube 52 terminating in dip leg 53 extending into the lower dense phase zone. Spiral deflectors 54 connect the short pipe 51 with tube 52 so that the gases which flow downwardly between the pipe and the tube are given a tangential swirling motion thus throwing the catalyst particles to walls of the tube so that the catalyst particles may be returned to the lower dense phase zone through the dip leg while the stripping gas passes upwardly through pipe 51 and is distributed by baffles 55 in the dense phase zone above plate 49. Similarly cyclone separators or other centrifugal separation means may be employed to prevent the catalyst particles from flowing upwardly in the stripping zone together with the stripping gas.

In addition to providing each downcomer with separate aeration means I may also provide the downcomers with slide valves or other flow control means (not shown) but generally speaking the use of such flow control means at these points is unnecessary.

As hereinabove stated, it is not essential that the stripping column be entirely within the reactor or regenerator since it may be partially within and partially without such chambers or it may be entirely below and on the outside of them. The upper part of each downcomer in the stripping column may be substantially on the same level with its associated plate or partition or it may extend upwardly therefrom but it should not extend to a point above the desired dense phase level in each particular stripping zone. The lower end of each downcomer should extend below the level of the dense phase into which the catalyst is to be introduced. Suitable valves or baffles may be employed wherever necessary to prevent upflowing gases or vapors in the stripping column from entering the downcomers in too great quantities.

While I have described in detail a specific example of the application of my invention to a catalytic cracking system and specific modifications of my invention it should be understood that the invention is not limited to such details since other applications of the invention and other modifications and alternative forms thereof will be apparent to those skilled in the art from the above description.

I claim:

1. A catalytic conversion system which comprises a unitary apparatus including a substantially vertical reactor, means for introducing charging stock vapors at a low point in said reactor and for introducing regenerated catalyst for suspension in upflowing vapors in said reactor whereby a dense catalyst phase may be maintained in the reactor, means for recovering catalyst from gases and vapors leaving the upper part of the reactor, a stripping column at least partially inside of the reactor having its upper end communicating with the dense catalyst phase in the reactor, a plurality of downcomers and associated partitions in said stripping column, means for introducing a stripping gas at the base of said stripping column and for passing said gas from a point below to a point above each partition whereby the stripping gas is finally commingled with gases and vapors in the reactor and whereby dense phase catalyst may flow directly from the dense phase in the reactor to the space in the stripping column above the top partition and be suspended by stripping gas from the point below said partition, dense phase catalyst may flow from a space above the top partition to the space above a second partition through a downcomer associated with said top partition, and catalyst may flow from the space above the second partition to a point below said partition through the downcomer associated with said second partition.

2. A powdered catalyst reactor and stripper which comprises a vertical chamber, means for introducing a gas or vapor at a low point therein and for introducing powdered catalyst for dense phase suspension in said gas or vapor, means for recovering solids from the gas or vapor leaving the upper part of the chamber, a vertical partition wall in said chamber extending upwardly to a point below the level of dense phase catalyst therein, the space enclosed by said vertical partition forming a stripping column, a plurality of downcomers and associated transverse partition plates within said stripping column, means for withdrawing catalyst from the base of the stripping column, means for introducing a stripping gas at a low point in said stripping column and for passing said gas upwardly therethrough, and means for passing said gas from a point below each transverse partition plate to a point above said plate whereby dense suspended catalyst phases may be formed above transverse partition plates and catalyst may be introduced to and withdrawn from said dense phases through said downcomers.

3. A powdered solids contacting and stripping system which comprises a vertical chamber, means for introducing a gas or vapor at a low point therein and for introducing powdered solids for dense phase suspension in said gas or vapor, means for removing gas or vapor substantially free from solids from the upper part of the chamber, a vertical conduit of smaller cross-sectional area than said chamber communicating with said chamber at a point below the level at which suspended solids are to be maintained therein, at least a part of said conduit being integral with a lower wall of said chamber, a plurality of downcomers and associated transverse partition plates within said conduit, means for withdrawing solids from the base of said conduit, means for introducing a stripping gas at a low point in said conduit and for passing said gas upwardly therethrough and means for passing said gas from a point below each transverse partition plate to a point above said plate whereby dense suspended solids phases may be formed above transverse partition plates and solids may be introduced to and withdrawn from said dense phases through said downcomers.

4. A catalytic conversion and stripping process which comprises introducing charging stock gases or vapors at a low point in a vertical reaction zone, introducing finely divided catalyst particles into said zone for dense phase suspension in upflowing gases or vapors therein, the vertical gas or vapor velocity in said zone being at such rate as to maintain said dense phase suspension, separating catalyst solids from gases in the upper part of said reaction zone and removing gases or vapors substantially free from solids from the upper part of said zone, downwardly withdrawing solids from a point below the dense phase level in said reaction zone into a stripping zone, introducing a stripping gas at a low point in said stripping zone and passing said gas upwardly therethrough and finally into said reaction zone, passing the catalyst solids downwardly in said stripping zone while out of contact with substantial amounts of upwardly flowing stripping gas and suspending the downwardly flowing solids in the upwardly flowing stripping gas in a plurality of dense phase suspension zones in the course of its flow from the top of said stripping zone to the bottom thereof, and maintaining at least a part of said stripping zone in indirect heat exchange relationship with the reaction zone.

JOHN F. SNUGGS.